United States Patent [19]

Gelbart et al.

[11] Patent Number: 5,359,451

[45] Date of Patent: Oct. 25, 1994

[54] HIGH EFFICIENCY ACOUSTO-OPTIC MODULATOR

[75] Inventors: Daniel Gelbart; Eviatar Halevi, both of Vancouver, Canada

[73] Assignee: Creo Products Inc., Burnaby, Canada

[21] Appl. No.: 11,244

[22] Filed: Jan. 29, 1993

[51] Int. Cl.$^5$ .............................................. G02F 1/33
[52] U.S. Cl. .................................................... 359/285
[58] Field of Search ................. 359/285, 305, 307, 301

[56] References Cited

U.S. PATENT DOCUMENTS 4,473,275  9/1984  David, Jr. et al. ................... 359/307
5,105,304  4/1992  Tanaka et al. ....................... 359/285

Primary Examiner—Mark Hellner

[57] ABSTRACT

The efficiency of an acousto-optic modulator or deflector is increased by re-using the undiffracted beam, causing the same light beam to travel multiple times through the modulator. In order to maintain the bandwidth of the modulator, the multiple passes are made co-axial. A polarizing beam combiner and a waveplate are used to transmit the incoming beam but reflect the beam on the second pass. The gain in the efficiency of the modulator is particularly large for low efficiency modulators.

3 Claims, 1 Drawing Sheet

↕ =POLARIZATION ∥ PAGE
⊙ =POLARIZATION ⊥ PAGE

◯ = CIRCULAR POLARIZATION

HIGH EFFICIENCY ACOUSTO-OPTIC MODULATOR

BACKGROUND OF THE INVENTION

The present invention relates to a method an apparatus for improving the efficiency of an acousto-optic modulator or deflector by successively returning the undiffracted beam through the acoustic wave within the modulator. The novel part is the method of keeping the successive beams co-axial.

Acousto-optic modulators and deflectors operate in the well known Bragg mode. An acoustic wave is set up in a crystal and a beam, typically produced by a laser, enters the acoustic wave at an angle (known as the Bragg angle) to maximize diffraction efficiency. Part of the beam is diffracted and part continues straight through the acoustic wave. For low efficiency devices most of the light is undiffracted and therefore wasted (for those applications were only the diffracted beam can be used). When the frequency of the acoustic wave is constant the device is usually referred to as a modulator and if the frequency is variable, causing a change in the diffraction angle, the device is referred to as a deflector. The current invention is suitable for both applications.

In order to re-use the wasted undiffracted light many schemes were proposed, however they all suffer from one common disadvantage. All prior art re-uses the undiffracted light by returning it to the modulator in a serpentine or spiral path. This was required since the mirror returning the light should not block the incoming beam, thus the incoming beam and the returned beam can not be co-axial. The disadvantage of these methods is that the successive beams take up a wider area of the acoustic wave than a single beam. The bandwidth of an acousto-optic modulator is limited by the acoustic transit time, thus using a wider light beam reduces the bandwidth of the device. An example of prior art is U.S. Pat. No. 4,473,275 using successive passes in a spiral manner. Another example is U.S. Pat. Nos. 3,988,055 using successive passes in a helical manner. U.S. Pat. Nos. 3,492,063 and 3,923,380 use successive passes in a serpentine fashion. No prior art teaches successive passes without causing the beam in the acousto-optic modulator to widen with each pass, therefore in all prior art there is a speed or bandwidth penalty paid for increasing the efficiency.

SUMMARY OF THE INVENTION

Accordingly, an important object of the present invention is to improve the deflection efficiency of an acousto-optic modulator without increasing the interaction time between the acoustic wave and the light beam. This objective is achieved by taking advantage of the fact that most lasers are polarized and a polarizing mirror, also known as a polarizing beam combiner (or beam splitter), transmits one polarization of light while fully reflecting the orthogonal polarization. Using a waveplate the polarization of the undiffracted light is changed, thus it can be added to the original laser beam without any losses. For a low efficiency modulator this can almost double the efficiency for a single re-use. If the undiffracted light is further re-used efficiency can be increased almost four fold.

BRIEF DESCRIPTION OF THE DRAWINGS

Other objects and advantages of the present invention will become apparent to those skilled in the art after consideration of the following specifications wherein.

DETAILED DESCRIPTION OF THE PREFERRED EMBODIMENT

Figure 1:
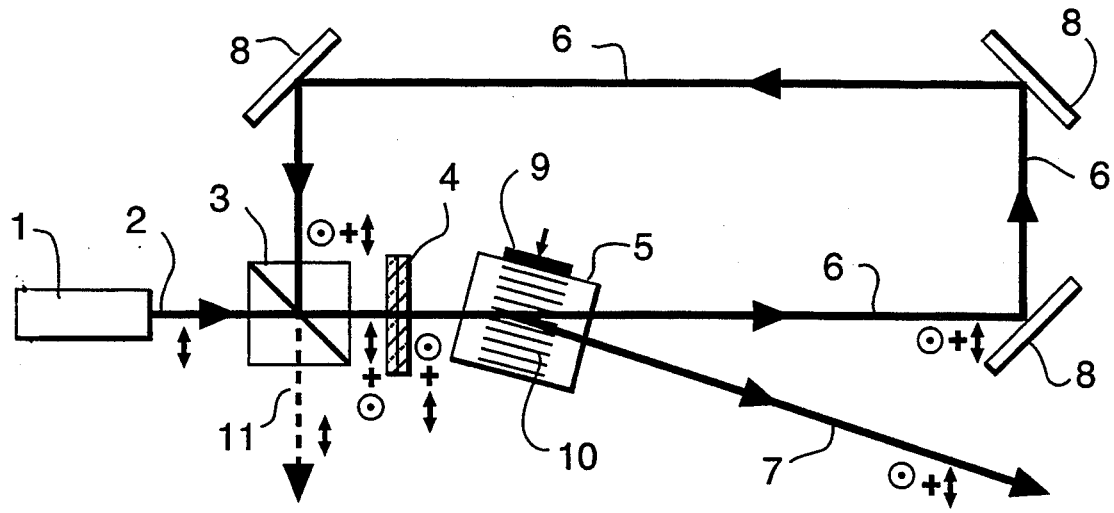
FIG. 1 is a schematic diagram of the present invention in which the undiffracted light is re-used once.

Referring now to FIG. 1, a polarized laser 1 directs a beam 2 through a polarizing beam combiner 3 and half-wave plate 4 into acousto-optic modulator 5. The polarization of laser 2 is parallel to the plane of the drawing and beam combiner 3 passes this direction of polarization with very low (<1%) losses. Waveplate 4, when oriented with its fast axis at 45° to the direction of polarization of beam 2, rotates the direction of polarization by 90°. When beam 2 emerges from waveplate 4 its polarization is at right angles to the plane of the drawing. The operation of waveplates, both half-wave and quarter wave are well known to those skilled in the art and need not be discussed here since they are covered by most textbooks dealing with physical optics.

The undiffracted part of beam 2 emerges form acousto-optic modulator 5 as beam 6. the diffracted part exits at an angle as beam 7. Modulator 5 contains an acoustic wave 10 generated by transducer 9 in response to a high frequency electric signal. Modulator 5 is rotated versus beam 2 at a small angle, known as the Bragg angle, to increase diffraction efficiency. This angle, as well as the angle of beam 7, are quite small (a few degrees) and are exaggerated in this drawing for the sake of clarity. Acousto-optic modulators are well known devices and need no further explanation. Beam 6, on its first pass, has a polarization direction orthogonal to the input beam 2. Beam 6 is returned to polarizing beam combiner 3 by being reflected from mirrors 8. Mirrors 8 are of very high reflectivity. they can be, by the way of example, of the multi-layer dielectric type having a reflectivity of well over 99% for a polarization direction parallel to the plane of the mirror. When beam 6 impinges upon the active layer of polarizing beam combiner 3 it is fully reflected into the acousto-optic modulator 5. By adjusting the angles of mirrors 8 the returned beam 6 can be made to completely overlap the incoming beam 2 therefore not requiring any more area of the acoustic wave 10 than the original beam 2. The returned beam 6 passes half-wave plate 4 before entering modulator 5. Passing through waveplate 4 will rotate the polarization of beam 6 to become parallel to the plane of the drawing. Some of this beam will be diffracted and added to beam 7 and the undiffracted part will be added to itself, however with a rotated polarization. Mirror 8 will reflect both polarizations of beam 6 however, when beam 6 arrives at beam combiner 3 for the second time, its polarization is parallel to the plane of the page and it will go through beam combiner 3 without being reflected, emerging as beam 11. Assuming the efficiency of the modulator 5 without using this invention is $\eta$, and assuming that the transmission of the modulator and reflection of the mirrors approaches 100% (a correct assumption for modern devices using multi-layer coatings), the amount of diffracted light is:

P out=P in×η+P in (1−η)×η, giving an equivalent efficiency of η eq=2 η−η². For low efficiency modulators (η<<1) this almost doubles the efficiency of modulator 5.

Figure 2:
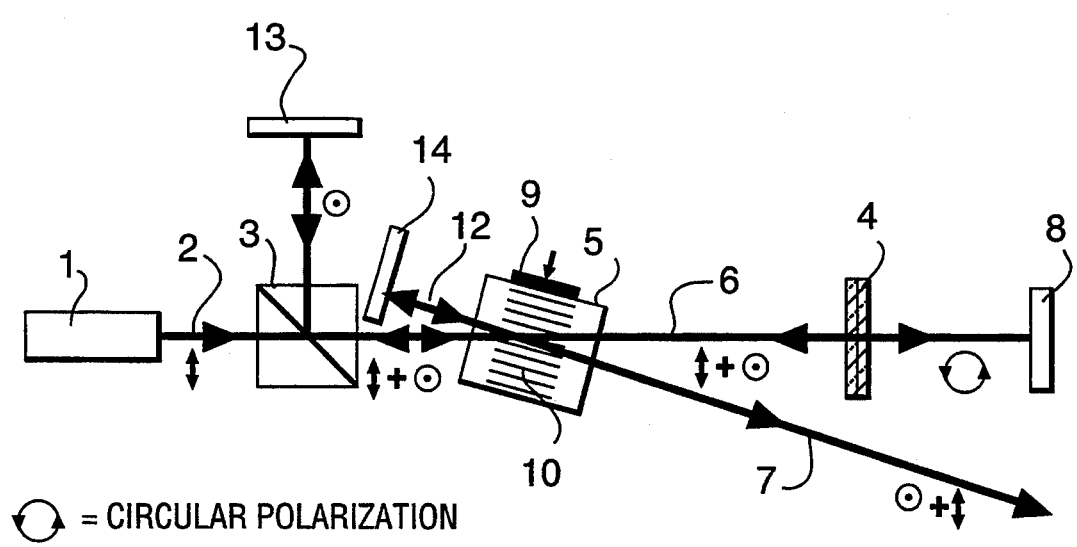
FIG. 2 is a schematic diagram of the present invention in which the undiffracted light is re-used multiple times while still remaining co-axial.

Even higher efficiency using the same number of components can be achieved using the arrangement shown is FIG. 2. In this case waveplate 4 is a quarter wave plate, again oriented with its fast axis at 45° to the direction of polarization of the incoming beam. A quarter wave plate will convert either vertically or horizontally polarized light into circularly polarized light. Passing through a quarter-wave plate twice is equivalent to passing through a half-wave plate once, thus placing a mirror behind a quarter-wave plate will have the same effect on the reflected light as passing through a half-wave plate (since the mirror causes the light to pass the quarter wave plate twice, generating a path equivalent to a half-wave plate). Beam 2 will go through modulator 5 in a manner similar to the way shown in FIG. 1. The diffracted part will emerge as beam 7 while the undiffracted part 6 will pass quarter-wave plate 4 and be retroreflected by mirror 8. Upon returning through modulator 5 some of the light will be diffracted as beam 12 while the rest will be reflected by beam combiner 3 (since it has a polarization which is orthogonal to the original polarization of beam 2) and retroreflected by mirror 13. The beam returning from mirror 13 is reflected by beam combiner 3 and is partially diffracted by modulator 5, adding to the diffracted beam 7. At the same time beam 12 is retroreflected by mirror 14 and the undiffracted component of this returned beam is added to the diffracted beam 7. The undiffracted part of the beam returning from mirror 13 passes one more time through waveplate 4 and has its polarization rotated to be parallel to the plane of the drawing. This beam is no longer reflected by beamsplitter 3 and is re-directed into laser 2. Some of this beam, however, is adding to beam 12 since it is diffracted on the way back. Using similar methods of efficiency calculations as used in FIG. 1, the equivalent efficiency of the modulator can be shown to be:

$$\eta eq = 4\eta - 8\eta^2 + 9\eta^3 + \ldots ; \text{ for } \eta << 1 \; \eta eq \approx 4\eta$$

Mirrors 8, 13, and 14 can be adjusted to have all the beams exactly co-axial thus the bandwidth of the modulator 5 is not reduced. The only slight reduction in bandwidth is caused by the optical transit time. The optical transit time through the successive passes has to be a small fraction of the desired response time of the system. This requirement is easily met using commercially available devices. For example, for commercial modulators and deflectors the physical distance between the elements shown in FIG. 1 or FIG. 2 is in the range of 150 mm to 300 mm. This corresponds to optical transit times of $2\times0.15/3\times10^8$ sec=1 nS to $2\times0.3/3\times10^8$ sec=2 nS. Since acousto optic modulators rarely work with pulses under 20 nS the extra 1 or 2 nS cause an insignificant spread in the pulse. When the layout of FIG. 2 is used as a deflector, mirror 14 has to be spherical with its center of curvature located at the center of the acoustic wave 10. This is required since the angle of beam 12 is not fixed in a deflector, as beam 12 and beam 7 are being deflected.

What is claimed is:

1. A high efficiency acousto-optic modulation system comprising of:
    an input beam of polarized light;
    an acousto-optic modulator using an acoustic wave to diffract some of the input beam while transmitting the remainder of the input beam as an undiffracted beam;
    means of changing the polarization state of said undiffracted beam by using a waveplate:
    means of re-directing said undiffracted beam and combining it with the input beam in a manner keeping the area the combined beams interact with the acoustic wave, substantially the same as the area over which the acoustic wave interacts with the input beam alone, thus maintaining the bandwidth of said modulator while increasing the amount of light in the diffracted beam, said combining utilizing the different polarizations of the said input beam and said undiffracted beam.

2. A high efficiency acousto-optic modulation system as claimed in claim 1 wherein the frequency of said acoustic wave is varied to change the angle of the diffracted beam.

3. A high efficiency acousto-optic modulation system as claimed in claim 1 or claim 2 wherein said means of re-directing beam are high reflectivity mirrors and said combining means are a polarizing beam combiner and a waveplate.

* * * * *